United States Patent

[11] 3,614,756

[72] Inventors Robert P. McIntosh
Saratoga;
Marco Padalino, San Jose, both of Calif.
[21] Appl. No. 4,666
[22] Filed Jan. 21, 1970
[45] Patented Oct. 19, 1971
[73] Assignee International Business Machines Corporation
Armonk, N.Y.

[54] MAGNETIC RECORD WITH SERVO TRACK PERPENDICULAR TO INFORMATION TRACK
9 Claims, 9 Drawing Figs.

[52] U.S. Cl. .......... 340/174.1 C, 179/100.2 CH, 340/174.1 B, 340/174.1 F
[51] Int. Cl. .......... G11b 5/28, G11b 5/38, G11b 21/08
[50] Field of Search .......... 340/174.1 B, 174.1 C, 174.1 F; 179/100.2 C, 100.2 CF, 100.2 CH, 100.2 MI, 100.2 S

[56] References Cited
UNITED STATES PATENTS

| | | | |
|---|---|---|---|
| 3,013,123 | 12/1961 | Camras | 179/100.2 C |
| 3,404,392 | 10/1968 | Sordello | 340/174.1 B |
| 3,541,270 | 11/1970 | Walther | 179/100.2 C |

*Primary Examiner*—Bernard Konick
*Assistant Examiner*—Vincent P. Canney
*Attorneys*—Hanifin and Jancin and Edward M. Suden

ABSTRACT: The invention relates to a servosystem used in a random access disk memory system which comprises a magnetic disk having servo tracks recorded such that the magnetic domains within the servo tracks are aligned radially from the center of the disk and data tracks which have the magnetic domains are aligned concentrically about the center of the disk, and a transducer capable of developing a data signal as a function of the rate of change of the magnetic flux associated with the data tracks and a servo signal generated by the magnitude of the absolute flux magnitude that it presented to the transducer by the transducer's relationship to the servo tracks on the magnetic disk, the servo signal and the data signals being generated either simultaneously or alternately in the magnetic transducer.

INVENTORS
ROBERT P. McINTOSH
MARCO PADALINO

BY Edward M. Suchey
AGENT

FIG. 3
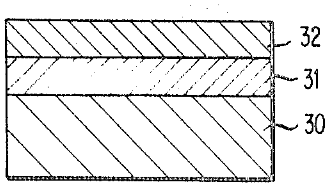
FIG. 4
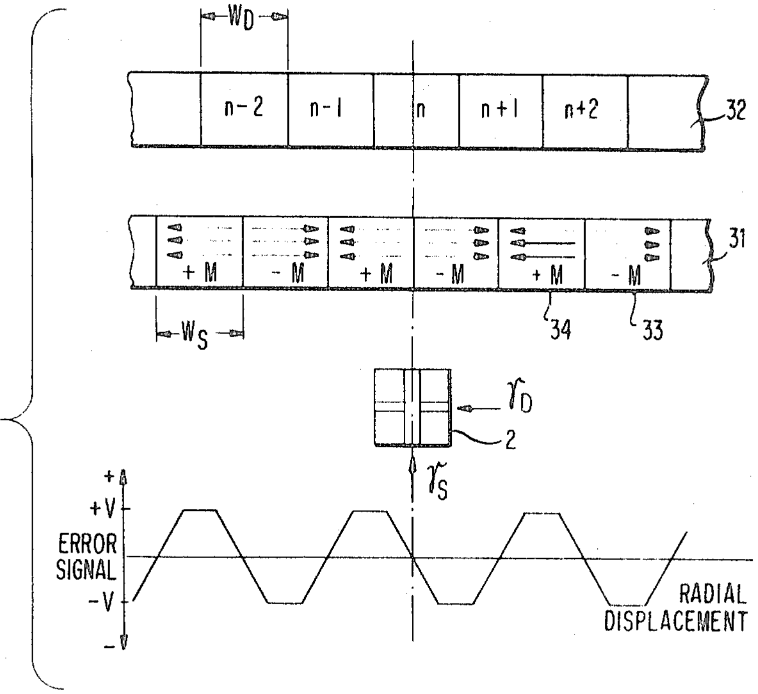
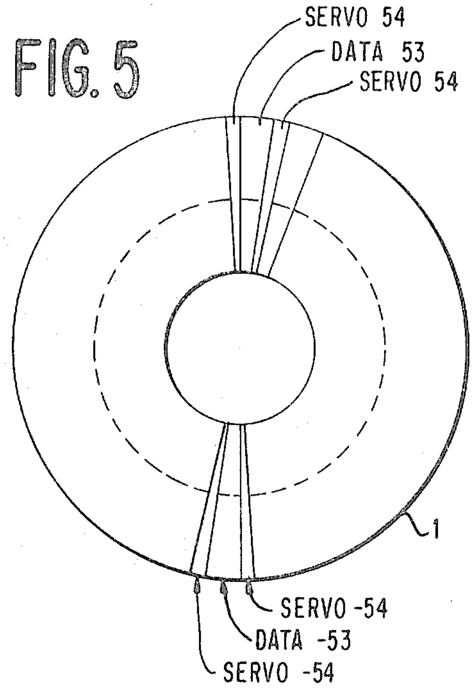
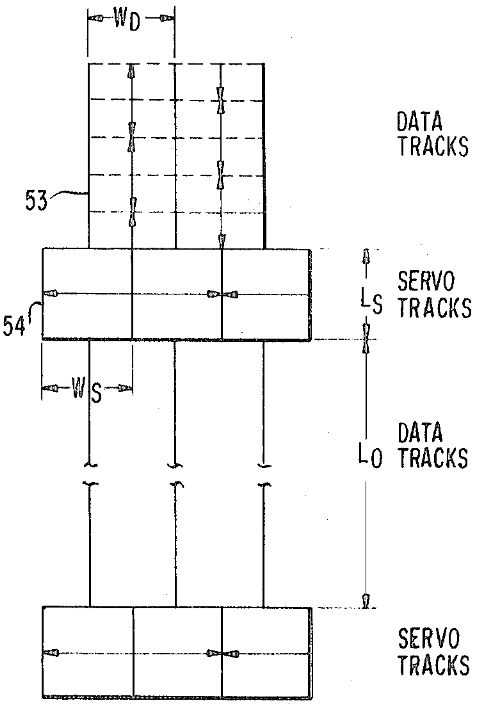
FIG. 6

MAGNETIC RECORD WITH SERVO TRACK PERPENDICULAR TO INFORMATION TRACK

BACKGROUND OF THE INVENTION

1. Field of the Invention

This invention relates to information recording and reproducing systems, and more particularly to random access memory systems which require the accurate positioning of a transducer relative to the information to be recorded or reproduced.

2. Prior Art

In disk-type random access magnetic memories where data is recorded in concentric circular tracks on the surfaces of disks, it is a continual aim to accurately align a magnetic transducer with a desired track. The degree of accuracy which the transducer can be positioned determines the spacing necessary between adjacent tracks and thereby largely influences the storage efficiency, that is, the number of characters per unit of area of the memory. In an attempt to increase the accuracy of alignment, several systems of various types have been proposed for servoing the transducer onto the tracks. These systems have generally employed positioning information in the form of several signals interspersed with the data in the recorded surface or reference patents permanently recorded on a disk surface. In addition, such systems have required a servo transducer to read the positioning information and a separate data transducer gain thereto. These features of the known servosystems inherently militate against high-storage efficiencies because of the stackup of mechanical tolerances in the gang transducers and the fact that a considerable portion of the available disk surface area is given over to the storage of positioning information.

A later development provided for a system for servoing a transducer into alignment with a desired data track on magnetic recording media by providing a single continuous linear recorded servo track located between each pair of adjacent data tracks and alternate servo tracks being written at different frequencies. A single transducer was provided which simultaneously read a data track and the servo tracks on either side of the desired data tracks and a means was provided for filtering the data from the servo information and then comparing the two servo signals to develop a position error signal for the transducer. The error signal was then supplied to an actuator to position the transducer. This system, however, had the inherent disadvantage that the data and servo frequencies recorded had to be widely spaced and the servo frequencies could not be harmonic of each other, so that there was no deleterious interaction between the data and the servo information. A further disadvantage of the system was that the magnetic transducer had a different transfer function for the data frequency than for the servo frequencies introducing unwanted errors.

An object of the present invention is to provide a servosystem for a disk-type random access magnetic memory to maintain a transducer in accurate alignment with a recording track, thus permitting a high-storage efficiency for the memory.

Another object of the invention is to provide for a servo system in a random access magnetic memory which provides servo tracks having a magnetic domains therein orientated radially from the center of the magnetic disk and data tracks having the magnetic domains orientated concentrically about the center of the disk such that the servo information and the data do not interreact.

Another object of the invention is to provide a servosystem for a random access magnetic memory which employs a single transducer capable of responding not only to the rate of change of the information recorded in the data tracks but also to the value of the absolute flux presented to the head from the recorded servo information in the servo track, the transducer providing a data output and a servo information output where the two outputs do not interact with each other.

SUMMARY OF THE INVENTION

Briefly the invention addresses the problem of locating a magnetic transducer through a desired data track on a magnetic disk in a random access memory system. Basically, the system consists of a magnetic disk having servo tracks in which the magnetic domains are orientated radially from the center of the disk and data tracks wherein the magnetic domains are orientated concentrically about the center of the disk such that the magnetic domain in the data tracks are orthogonal to the magnetic domain in the servo tracks. Also provided is a magnetic transducer which is capable of providing a signal in response to the rate of change of the magnetic domains in the data tracks and another output as a function of the absolute magnitude of the magnetic field presented to the transducer by the magnetic domains in the servo tracks. The rate of change portion of the magnetic transducer is connected to normal data read/write circuitry for writing or reading data onto the magnetic disk. The output of the flux-sensing portion of the magnetic transducer provides an output which is indicative of the position of the magnetic head with respect to the servo tracks which are so aligned as to indicate the relative position of the transducer to a desired data track. The output of the flux-sensing portion of the magnetic transducer is therefore connected to normal servo circuitry which interprets the error voltage generated in the magnetic flux portion of the transducer and actuates the actuator such that the magnetic transducer is properly and accurately aligned with a desired data track on the magnetic disk.

One advantage of this servosystem is that it provides an error-positioning signal which is independent of the movement of the magnetic media with respect to the transducer, such that the speedup or slowdown of the magnetic medium will not effect the position error circuitry response to a given position error in the system. This advantage is due to the fact that the flux-sensing portion of the magnetic transducer is capable of providing an output even though the magnetic medium on which the servo information is recorded is at a complete stop.

Another advantage of the servosystem is that it provides for orthogonal isolation between magnetic effects of the servo information and the data information recorded on the magnetic disk. The foregoing and other objects, features, and advantages of the invention will be apparent from the foregoing and more particular description of the preferred embodiments of the invention, as illustrated in the accompanying drawings.

FIGS. *2a–2d* show a magnetic head having a first portion responding to the rate of change of magnetic flux and a second portion responding to the absolute magnitude of magnetic flux where the rate of change of magnetic flux and the absolute value magnetic flux are orthogonal to each other.

FIG. 3 shows a cross section of a dual layer, dual coercivity magnetic disk.

FIG. 4 shows the relationship between data tracks on the upper layer and servo tracks on the lower layer of the dual layer, dual coercivity magnetic disk of FIG. 3 and further shows the error signal generated by the magnitude of the flux in a magnetic transducer as a function of the position of the magnetic transducer with respect to the servo tracks on the lower layer of the dual layer, dual coercivity magnetic disk.

FIG. 5 shows a magnetic disk having servo and data sections alternately placed about the center of the magnetic disk.

FIg. 6 shows the relationship of data tracks to servo tracks in the data sections and servo sections on the magnetic disk as shown in FIG. 5.

DETAILED DESCRIPTION OF THE PREFERRED EMBODIMENT

In its most general sense, the invention relates to a servo-positioning system to be used in their random access magnetic disk memory storage system which comprises a magnetic disk having servo tracks in which the magnetic domains are orientated radially from the center of the magnetic disk and data tracks in which the magnetic domains are orientated concentrically about the center of the disk and a magnetic transducer capable of responding to the rate of change of magnetic flux in the data tracks to provide a data signal and means to provide a servo signal as a function of the absolute magnitude of the magnetic flux that is presented to the magnetic transducer by the magnetic domains in the servo tracks.

Figure 1:
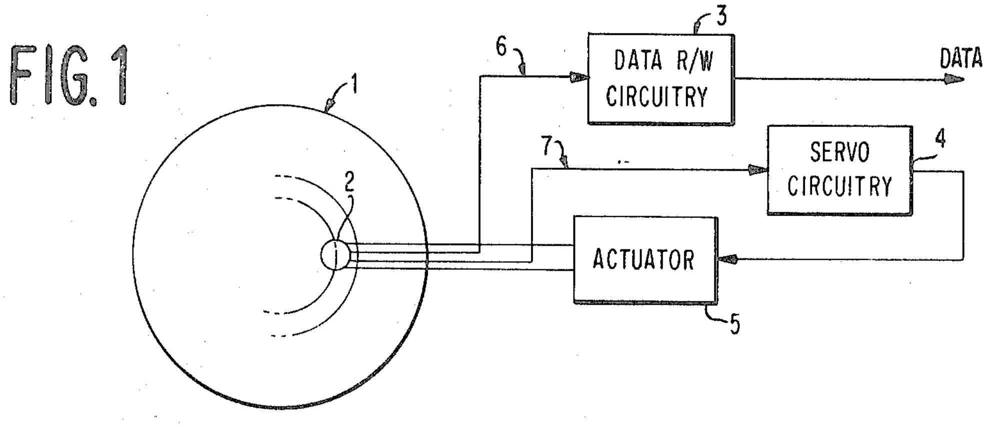
FIG. 1 shows a block diagram of the servo-positioning system in a random access magnetic storage system.

FIG. 1 shows the general structure of a random access magnetic disk memory storage system having a magnetic disk 1 and a magnetic transducer 2 as heretofore described. The data output line 6 of magnetic transducer 2 is connected to data read/write circuitry which is standard read/write circuitry used in the art to read and write data information on a magnetic disk by the rate of change of magnetic flux principle. The rate of change magnetic flux principle has been known with the field of magnetic recording for many years and may be readily found in the text Magnetic Recording Techniques, by W. E. Stewart, McGraw-Hill Book Company, Inc., 1958. Output line 7 is the output of magnetic transducer 2 which is a voltage that corresponds to the absolute value of the magnetic flux presented to magnetic transducer 2. As will be explained in the following discussion, this voltage can be used as a measure of the position of transducer 2 to a desired track on magnetic disk 1. Therefore, output line 7 of magnetic transducer 2 is connected to standard servo circuitry 4 for interrogating the voltage so as to obtain information as to whether magnetic transducer 2 is centered on the desired data track on magnetic disk 1. Standard servo circuitry 4 is connected to actuator 5 for positioning the magnetic transductor 2 such that magnetic transducer 2 is in the desired relationship with a data track on magnetic disk 1. Actuator 5 may be any of the well-known actuating means available in the servo-positioning art of today. It should be realized that an output voltage will appear on output line 7 regardless of whether magnetic disk 1 is rotating or not. It, therefore, can be readily realized that speed fluctuations within the rotation of magnetic disk 1 does not effect the accuracy of the positioning of magnetic transducer 2 with respect to magnetic disk 1.

Figures 2A, 2B:
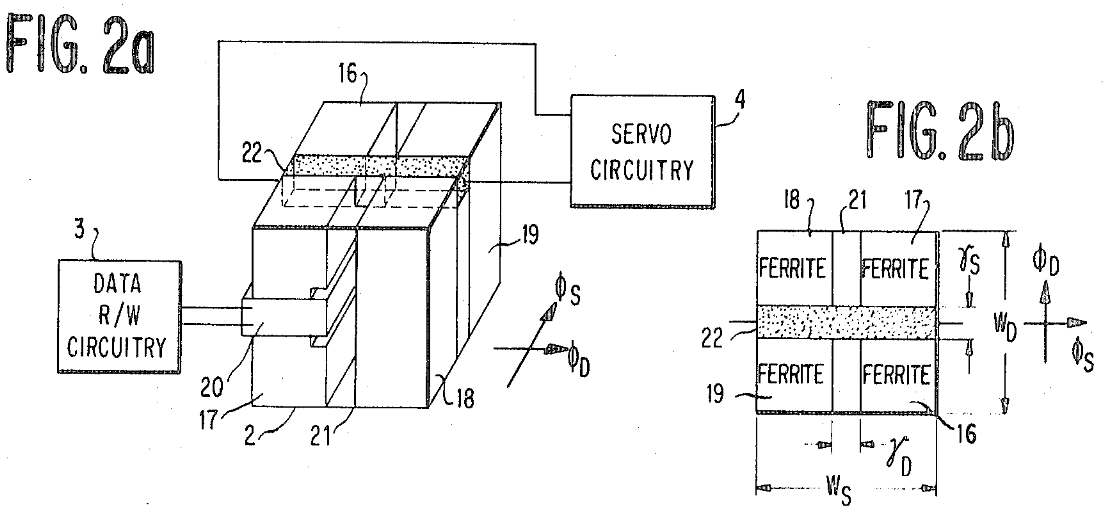

FIG. 2*a* shows a magnetic transducer 2 capable of responding both to the rate of change of magnetic flux in a data track to provide a data signal and to the absolute magnitude of magnetic flux generated by the magnetic domains in the servo track to provide a servo signal. Magnetic transducer 2 has 4 ferrite poles 16, 17, 18 and 19. A winding 20 is wound about poles 16 and 17 and winding 20 is connected to the data read/write circuitry 3 for the reading and writing of magnetic data under the rate of change of magnetic flux principle. A magnetic gap 21 is formed between a first half of the magnetic transducer as defined by ferrite poles 16 and 17 and a second half of magnetic transducer as defined by ferrite poles 18 and 19. The magnetic gap 21 may be filled with such material as glass. Thus, for data transfer (write and read) the core structure, material, winding and gap length are designed as in a conventional inductive magnetic transducer. Between a first half of magnetic transducer 2 as defined by ferrite poles 17 and 18 and a second half of magnetic transducer 2 as defined by ferrite poles 16 and 19, a semiconductor layer of material exhibiting Hall or Sony effects is deposited so that all the servo magnetic flux penetrating the ferrite poles 16, 17, 18 and 19 is effectively utilized. Semiconductor material exhibiting Hall or Sony effects are well known in the art and have been specifically used in the design of magnetic transducers of the flux-sensitive type.

FIG. 2*b* shows a top view of the magnetic head of FIG. 2*a*. The width of the flux-sensitive portion of magnetic transducer 2 is designated as $W_S$and the width of the rate of change portion of the magnetic transducer 2 is shown as $W_D$. With the servosystem of this invention, $W_S$ must be at least equal to $W_D$. Where high-track density is desired on magnetic disk 1, $W_S$ is made to equal $W_D$ in magnetic transducer 2 and the width of the data tracks will equal $W_D$ and the width of the servo tracks will equal $W_S$. However, where high-track density is not desired, the data tracks on the magnetic disk 1 may be of a narrower width than the servo tracks for there is no requirement in that situation for the data tracks to be adjacent to each other. However, it is always necessary to have the servo tracks on magnetic disk 1 adjacent to each other; and, therefore, the ratio of $W_S$ to $W_D$ is dependent upon the respective widths of the servo track and the data track on the magnetic disk 1. It can rarely be realized that where high density of data tracks is required that the ration between $W_S$ and $W_D$ will equal 1.

The width of the semiconductor material defining the flux-sensing gap is designated by $\gamma_S$ and the width of the nonmagnetic gap for sensing the rate of change of magnetic flux in data tracks is designated as $\gamma_D$.

Figure 2C:
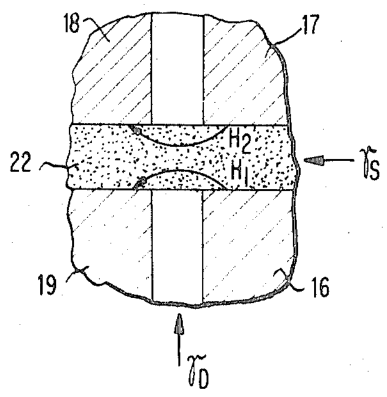
Figure 2D:
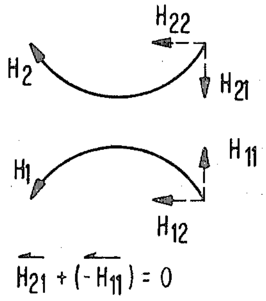

FIG. 2*c* shows the magnetic field components in the semiconductor 22 due to the writing and reading of data by the rate of change-sensing portion of the magnetic transducer 2. The field component H1 is shown going from ferrite section 16 to ferrite section 19 across the nonmagnetic gap $\gamma_D$ and magnetic component $H_2$ is connecting ferrite portions 17 and 18 by crossing the nonmagnetic gap $\gamma_D$ through the semiconductor 22. FIG. 2*d* shows the vectorial analysis of the magnetic components $H_1$ and $H_2$. It can be seen that the vectorial addition of the components that would effect the Hall or Sony effect of the semiconductor 22 will cancel each other out; and therefore, the reading or writing of data by means of the rate of change portion of the magnetic transducer does not interact with the flux-sensing portion of the magnetic transducer 2.

It can readily be realized that from FIGS. 2*a* through 2*d*, that a magnetic transducer heretofore disclosed is capable of responding either separately or simultaneously to the rate of change of magnetic flux in a first direction and to the magnitude of the magnetic flux in a second direction.

Magnetic disk 1 may take on many configurations. Two types of magnetic disk 1 will be herein described.

FIG. 3 shows a cross section of a dual coercivity, dual layer magnetic disk. Upper layer 32 is of a low-coercivity magnetic material and lower layer 31 is of a high-coercivity material. Layer 30 is a base material carrying layers 31 and 32. Such a magnetic disk is well known in the art and can be readily found in U.S. Pat No. 3,219,354, entitled, "Magnetic Recording Media."

This first type of disk arrangement will be described under a high-track density requirement. Concentric servo tracks are recorded in the high-coercivity lower layer 31 of the disk. Each servo track has the magnetic domain therein contained orientated radially from the center of the disk and adjacent servo tracks have the magnetic domains therein orientated 180°from each other. This can clearly be seen by viewing servo tracks 33 and 34 in the high-coercivity lower layer 31. The boundary between any two servo tracks defines the center of a data track on the low-coercivity upper layer 32. With the high-track density requirement, the width of the data track $W_D$will equal the width of the servo tracks $W_S$. If the magnetic transducer 2, heretofore described, is moved radially from the center of the disk an error signal will be generated as shown in FIG. 4. As can be seen when transducer 2 is centered on a data track, the flux contribution from two adjacent servo tracks will be equal and opposite producing a zero error signal from the flux-sensing portion of the magnetic transducer 2. Further, there is a predictable relationship between the signal generated by the flux-sensing portion of the magnetic transducer 2 and its position with respect to the data track on the magnetic disk 1. Given such an error signal, it is well within the skill of the art to generate both coarse positioning and fine positioning of magnetic transducer 2. By counting the number of zeros crossing as magnetic transducer 2 is moved radially from the center of the disk, the address of the desired track may be derived and once positioned on a desired track, fine positioning may be done by positioning the transducer as a function of the magnitude and polarity of the error signal generated by the flux-sensing portion of the magnetic transducer 2.

FIG. 5 shows a second arrangement of the magnetic disk 1, having alternating servo 54 and data 53 sections. In the servo sections 54, servo data would be written as concentric tracks in the same manner as the servo data was written in the first type of magnetic disk heretofore described, The necessary controlled circuitry for interrogating when the magnetic transducer 2 would be within a servo or data area is well known within the state of the art and can readily be found by way of example only, in U.S. Pat. No. 3,185,972, entitled, "Transducer Positioning System Utilizing Record with Interspersed Data Positioning Information."

FIG. 6 shows the relationship between data tracks in data sectors 53 and servo tracks in servo sectors 54. Once again the assumption has been made that high-track density is required. It can readily be seen that the servo tracks are recorded in the same manner as previously described in the high-coercivity lower layer 31 of the first type of magnetic disk heretofore described. Again the boundary condition between two adjacent servo tracks in servo sections 54 define the center of a data track in data sections 53. The length of the servo track is designated by $l_s$ and the length of the data tracks is designated $l_d$. Sampling-data servo theory will dictate the proper choice of $l_s$ to lto insure proper tracking by the magnetic transducer of a desired data track in data section 53.

In summary, it is the combination of the magnetic transducer heretofore disclosed and the first type of magnetic disk which provides a transducer-positioning system capable of simultaneously and continuously presenting both data and servo information to the random access magnetic disk memory storage system. Further, this combination of magnetic disk and magnetic transducer eliminates the error in positioning that was heretofore encountered due to changes in speed of the rotating disk and allow the accurate positioning of the magnetic transducer independent of the speed of rotation of the magnetic disk. The combination of the magnetic transducer and the second type of magnetic disk heretofore described, can also provide for the accurate positioning of the magnetic transducer independent of the speed variations of the magnetic disk.

While the invention has been particularly shown and described with reference to the preferred embodiments thereof, it would be understood by those skilled in the art that various changes in form and detail may be made therein without departing from the spirit and scope of the invention.

What is claimed is:

1. A transducer-positioning servosystem for use in a random access magnetic disk memory comprising:

a magnetic disk having servo tracks and data tracks recorded thereon, the magnetic domains of said servo tracks being orientated radially from the center of said magnetic disks, and the magnetic domains of said data tracks being orientated concentrically about the center of said magnetic disks; and a magnetic transducer means for sensing said data tracts by a rate of change sensing means and for sensing said servo tracks by an absolute flux-sensing means.

2. A transducer-positioning servosystem as set forth in claim 1 wherein said magnetic transducer means is comprised of an integral structure comprising:

a magnetic-sensing portion having a nonmagnetic gap for sensing the rate of change of magnetic flux of a data signal recorded in said data tracks when said data tracks are moved relative to said nonmagnetic gap; and a flux-sensing portion having a flux-sensing gap disposed at an angle to said nonmagnetic gap for sensing the absolute flux value from said servo tracks.

3. A transducer positioning servosystem as set fourth in claim 2 wherein said flux-sensing gap in said flux-sensing portion of said magnetic transducer is disposed at an angle of 90°-from said nonmagnetic gap in said magnetic sensing portion of said magnetic transducer.

4. A transducer-positioning servosystem as set forth in claim 1 wherein said magnetic disk is a magnetic dual layer, dual coercivity disk comprising:

a plurality of adjacent concentric serve tracks recorded in the high-coercivity layer as a series of discrete magnetized domains orientated radially from the center of said disk, each of said servo tracks having all domains in the same orientation, and alternate ones of said servo tracks having domains of opposite orientation; and a plurality of concentric data tracks recorded in the low-coercivity layer as is a series of discrete magnetized domains orientated concentrically around the center of said disk, said servo tracks being at least the width of said data tracks, and each of said servo tracks overlapping evenly on said data tracks.

5. A transducer-positioning servosystem as set forth in claim 4 wherein said magnetic transducer means has an integral structure comprising:

a magnetic-sensing portion having a nonmagnetic gap for sensing rate of change of magnetic flux of a data signal recorded in one of said data tracks when said data track is moved relative to said nonmagnetic gap;

a flux-sensing portion having a flux-sensing gap disposed at an angle to said nonmagnetic gap for continuously sensing the absolute flux value from said servo tracks; and said magnetic transducer simultaneously sensing both data from said tracks and servo information from said servo tracks.

6. A transducer-positioning servosystem as set forth in claim 5 wherein said flux-sensing gap in said flux-sensing portion of said magnetic transducer is disposed at an angle of 90°from said nonmagnetic gap in said magnetic-sensing portion of said magnetic transducer.

7. A transducer-positioning servosystem as set forth in claim 1 wherein said magnetic disk has alternating first and second sections comprising:

a plurality of adjacent concentric servo tracks recorded in said first sections as a series of discrete magnetized domains orientated radially from the center of said disk, each of said servo tracks having all domains in the same orientation and alternate ones of said servo tracks having domains of opposite orientations; and a plurality of concentric data tracks recorded in said second sections as a series of discrete magnetized domains orientated concentrically about the center of said disk, said servo tracks being at least the width of said data tracks, and the center of each of said data tracks being the boundary between two adjacent said servo tracks.

8. A transducer-positioning servosystem as set forth in claim 7 wherein said magnetic transducer means has an integral structure comprising:

a magnetic sensing portion having a nonmagnetic gap for sensing rate of change magnetic flux of a data signal recorded on one of said data tracks when said data track is moved relative to said nonmagnetic gap;

a flux-sensing portion having a flux-sensing gap disposed at an angle to said nonmagnetic gap for sensing the absolute flux value from said servo tracks; and said magnetic transducer means providing a data signal from said magnetic sensing portion from data recorded in said second sections of said magnetic disks and for producing a servo signal from the servo tracks in said first sections of said magnetic disk.

9. A transducer-positioning servosystem as set forth in claim 8 wherein said flux-sensing gap in said flux-sensing portion of said magnetic transducer is disposed at an angle of 90° from said nonmagnetic gap in said magnetic sensing portion of said magnetic transducer.